(12) United States Patent
Carlson et al.

(10) Patent No.: US 10,534,165 B1
(45) Date of Patent: Jan. 14, 2020

(54) ATHERMAL CASSEGRAIN TELESCOPE

(71) Applicant: BAE Systems Information and Electronic Systems Integration Inc., Nashua, NH (US)

(72) Inventors: Robert T Carlson, Bedford, NH (US); Mark C Janelle, Bedford, NH (US); Ian B Murray, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/124,869

(22) Filed: Sep. 7, 2018

(51) Int. Cl.
*G02B 23/00* (2006.01)
*G02B 23/02* (2006.01)

(52) U.S. Cl.
CPC ............ *G02B 23/02* (2013.01); *G02B 23/00* (2013.01)

(58) Field of Classification Search
CPC ...... G02B 5/08; G02B 5/0808; G02B 5/0816; G02B 5/10; G02B 17/00; G02B 17/002; G02B 17/02; G02B 17/06; G02B 17/0668; G02B 17/065; G02B 17/08; G02B 17/0804; G02B 17/0868; G02B 17/0864; G02B 23/00; G02B 23/02; G02B 23/06; G02B 23/16; H04B 10/00; H04B 10/11; H04B 10/112; H04B 10/1121; H04B 10/1123; H04B 10/1125; H04B 10/1127; H04B 10/1129; H04B 10/114; H04B 10/1141; H04B 10/1143; H04B 10/1149; H04B 10/116; H04B 10/118
USPC ....... 359/362, 363, 364, 365, 366, 399, 400, 359/429, 430, 871, 872, 883, 884, 850, 359/853, 855, 856, 857, 858, 859, 860, 359/864; 398/118, 121, 122, 123, 124, 398/125, 127, 128, 129, 130, 131, 135, 398/136, 137, 138, 182, 201, 202, 212
See application file for complete search history.

(56) References Cited

U.S. PATENT DOCUMENTS

| 2,670,656 | A | * | 3/1954 | Braymer | ................. | G02B 23/00 |
| | | | | | | 359/503 |
| 5,138,484 | A | * | 8/1992 | Schubert | ............ | G02B 17/0808 |
| | | | | | | 250/330 |
| 5,155,327 | A | | 10/1992 | Hoag | | |
| 5,191,469 | A | * | 3/1993 | Margolis | ................ | G02B 15/15 |
| | | | | | | 359/366 |

(Continued)

OTHER PUBLICATIONS

Pszczel, M.B., and D. Bucco. Review of techniques for in0flight transfer alignment. No. ARL-GW-TN-012. Aeronautical Research Labs Melbourne (Australia), 1992.

(Continued)

*Primary Examiner* — Arnel C Lavarias
(74) *Attorney, Agent, or Firm* — Maine Cernota & Rardin; Scott J. Asmus

(57) ABSTRACT

A Cassegrain telescope design consists of a silicon primary mirror bonded into a silicon-carbide (SiC) telescope metering tube. A secondary mirror is bonded directly to the telescope window. The window sits in a SiC bezel that is bonded to the SiC telescope tube. A graphite snout is bonded to the rear of the primary mirror and extends forward into the telescope. The snout incorporates a field stop that blocks stray light and sources outside the acquisition field of view (FOV). A lens cell threads into the snout and holds two lenses that collimate the light exiting that end of the telescope.

20 Claims, 11 Drawing Sheets

(56) References Cited

U.S. PATENT DOCUMENTS

| | | | |
|---|---|---|---|
| 5,808,732 A | 9/1998 | Lewely | |
| 6,195,044 B1 | 2/2001 | Fowell | |
| 6,285,927 B1 | 9/2001 | Li et al. | |
| 6,504,502 B1 | 1/2003 | Wu et al. | |
| 7,277,223 B2 * | 10/2007 | Baun | G02B 7/1827 359/399 |
| 8,213,803 B2 | 7/2012 | Wu et al. | |
| 9,260,335 B1 | 2/2016 | Miller et al. | |
| 2002/0186479 A1 * | 12/2002 | Schoppach | G02B 7/008 359/820 |
| 2009/0152391 A1 | 6/2009 | McWhirk | |
| 2009/0214216 A1 | 8/2009 | Miniscalco | |
| 2009/0324236 A1 | 12/2009 | Wu | |
| 2011/0261187 A1 | 10/2011 | Wang | |
| 2015/0219767 A1 | 8/2015 | Humphreys | |
| 2016/0043800 A1 | 2/2016 | Kingsbury | |
| 2016/0046387 A1 | 2/2016 | Frolov | |

OTHER PUBLICATIONS

Nguyen, Tam Nguyen Thuc. Laser beacon tracking for free-space optical communication on small-satellite platforms in low-earth orbit. Doss. Massachusetts Institute of Technology, 2015.

EP Search Report, EP 18160004.0, dated Jul. 10, 2018, 9 pages.

Guelman M et al., "Acquisition and pointing control for inter-satellite laser communications", IEEE Transactions on Aerospace and Electronic Systems, IEEE Service Center, Piscataway, NJ US, vol. 40, No. 4, Oct. 31, 2004 (Oct. 31, 2004), pp. 1239-1247, XP002623388, ISSN: 018-9251, D0I: 10.1109/TAES.2004. 1386877. Section II; p. 1240-1242.

* cited by examiner

SATELLITE LASER-COM ENVIRONMENT

SIGNAL OF INTEREST BEACON STEPS FOR LASER COMMUNICATIONS

TELESCOPE COMPONENTS

TELESCOPE COMPONENTS

TELESCOPE DETAIL

CASSEGRAIN TELESCOPE OPTICAL RAY PATH

STRUCTURAL FEA MODELING PERFORMANCE

SPDT SURFACE PERFORMANCE

1000

ATHERMALIZED TELESCOPE PERFORMANCE

TELESCOPE ASSEMBLY AND ALIGNMENT METHOD

ATHERMAL CASSEGRAIN TELESCOPE

FIELD

The disclosure relates to wireless telecommunications, and more particularly, to a space lasercom telescope device, system, and method that enables robust wireless laser communications.

BACKGROUND

Due to an explosion in both civilian and military wireless communication, there is a growing need for high speed, reliable, secure, wireless communication of large amounts of data between communicating nodes. It should be noted that the term "wireless" is used throughout this disclosure to refer to any communication that does not depend on a physical link between sender and receiver. Hence, the term "wireless", as used herein, excludes fiber optic communication as well as communication over copper wires.

Traditional communication by wireless radio frequencies suffers from several shortcomings, many of which arise from the wide geographic dispersion of typical radio emissions (e.g. side lobes). Even when directional antennae and antenna arrays are used, radio signals are generally disbursed over large geographic areas, causing rapid attenuation of the signal strengths with distance, and also causing the signals to be relatively easy to intercept by unintended receivers. Due to the geographic overlap of radio communication signals, it is typically necessary to assign radio transmissions to specific frequency bands, which are often in limited supply. Furthermore, it is relatively easy for hostile antagonists to attempt to jam radio communications by transmitting radio signals at high energies that blanket a region of interest.

There are several approaches that attempt to address these problems of wireless radio communications. For example, bandwidth restrictions can be mitigated by opportunistically seeking and using bands that are nominally assigned to other uses, but are not currently in use. Various time and coding schemes can be employed to allow more than one communication link to share the same frequency band. So-called "multi-user" detection can also be employed to further distinguish signals transmitted on overlapping frequencies. The geographic range of wireless signals may also be extended by implementing signal relay nodes within a region of interest.

Security of wireless radio communications can be improved, for example, by employing secure transmission methods such as frequency "hopping," by adding pseudo-noise to communications, and by encoding communications with sophisticated, virtually impregnable cyphers. The Link 16 protocol is an example of this approach.

Nevertheless, all of these approaches to radio communication include significant disadvantages, such as increased cost and complexity, and message processing overhead that can slow communication and limit data transfer speeds.

Given these limitations, laser communication, or "lasercom," offers an attractive wireless alternative to radio communication, especially when point-to-point communication is required. Notably, the non-dispersed, focused character of laser communication intrinsically avoids most of the problems that are associated with radio communication. In particular, there is no need to assign frequency bands to lasercom users, because interference between laser signal beams is avoided so long as two beams are not directed to the same recipient. Laser signals experience very little attenuation as a function of distance, because the signal energy remains tightly focused in a beam. Communication security is also intrinsically high, as the interception of and interference with laser communications requires direct interception of a laser communication beam and/or focusing jamming beams directly at an intended signal receiver.

One important application that can benefit significantly from lasercom is satellite communications, where line-of-sight access is generally available, and where the communication distances are very great. Lasercom can provide communication data rates for satellites that are much higher than radio data rates, with unmatched anti-jam characteristics and an inherently low risk of communications intercept. Lasercom also eliminates the need for frequency planning and authorization, and circumvents the highly congested RF spectrum bandwidth constraints that limit the practical data rates available to users of RF links.

FIG. 1 depicts a satellite lasercom environment 100. Laser communications holds great promise for multi-Gbps (Gigabits per second) connections 105 between space platforms 110, as well as connections 115 between ground-based nodes 120 and space platforms 110, owing to the availability of efficient, multi-watt laser sources and exceedingly high antenna gain, having beam widths of only 10-20 microradians and telescope apertures that are only four to eight inches in diameter. Even when much lower data rates of tens to hundreds of mega-bits per second (Mbps) are of interest, lasercom may be desirable due to its inherent Low Probability of Intercept (LPI), Low Probability of Detection (LPD), and anti-jam communications link security.

It should be noted that the disclosure herein is mainly presented with reference to satellite communication. However, it will be understood by those of skill in the art that the present disclosure is not limited to satellite communication, but also applies to other implementations of laser communication.

Of course, there are certain problems associated with laser communication that arise specifically from the focused nature of laser beams. In particular, it is necessary for communicating nodes to identify each other and align their lasers so as to effectively communicate. In the case of satellite lasercom, these identification and alignment problems are especially acute, because laser sources that are well separated by terrestrial standards, for example several miles apart from each other, may nevertheless appear to be almost geographically overlapping from the viewpoint of a satellite. Furthermore, thermal and other atmospheric effects can lead to both frequency (wavelength) and angular (apparent location) shifting of an incident laser communication beam, even after it is identified and aligned. The angular vibrational effects, together with other short-term mechanical instabilities of the satellite or other receiving node, are referred to herein collectively as "jitter."

FIG. 2 is a flow chart depicting steps 200 to establish and maintain laser communications. There are at least four steps to establish and maintain laser communications. First, a candidate light source, referred to herein as a "hot spot," is identified from within a scene of interest 205. Second, the hot spot is verified as being a communication signal and its transmission source is identified so as to determine if it is a signal of interest (verify it is a beacon) 210. Third, the optics of the lasercom receiving system is aligned with the incoming beam (pull-in the beacon) 215. Finally, once communication has been established, the beam is tracked during communication so that the alignment is maintained and the communication is not interrupted 220.

What is needed is a device, system, and method for a telescope optical system precision star tracker in addition to the lasercom function providing low-SWAP and cost-effective manufacturability and alignment.

SUMMARY

An embodiment provides an athermal two-mirror Cassegrain lasercom telescope device comprising a telescope metering tube; a primary mirror affixed to the telescope metering tube; a window; a secondary mirror supported by the window; an internal Acquisition FOV field stop snout bonded to a rear of the primary mirror and extending forward into the telescope metering tube; and a lens cell affixed to the snout and holding at least two lenses that collimate light exiting an end of the telescope metering tube. In embodiments the telescope metering tube comprises a low Coefficient of Thermal Expansion (CTE) silicon carbide (SiC). Other embodiments comprise a star tracker navigation function in addition to laser communications wherein a solar rejection coating on the window passes a spectral region comprising 1300-1600 nm, to allow star energy to be used for sensing. In subsequent embodiments component CTE difference is 0 to 0.2 ppm/deg C. For additional embodiments the window comprises fused silica having a CTE of about 0.55 ppm/deg C. In another embodiment, the primary mirror and the telescope metering tube have a substantially exact CTE match, whereby rigid epoxy with a low CTE is used to maintain optical alignment over temperatures between −40 and +80 degrees C. For a following embodiment the window is about 0.25" thick, further comprising a solar rejection coating on an outer surface. In subsequent embodiments a long body of the snout performs a spatial light baffle function, and a hole near an end is a field stop; whereby scattered light and off-axis solar flux is reduced. In additional embodiments the snout is fabricated from a low-CTE pyrolytic graphite for light weight and to match a CTE of the primary mirror. In included embodiments a flange of the snout is rigidly bonded to a rear surface of the primary mirror whereby the lens cell is centered during thermal cycling. In yet further embodiments the athermal telescope comprises a Silicon Carbide (SiC) telescope metering structure with Silicon (Si) optics, wherein a CTE of these are 2.6 ppm/deg C. for Si and 2.2-2.6 ppm/deg C. for SiC. In related embodiments the window comprises N-BK7 having a CTE of about 7 ppm/deg C. For further embodiments the window comprises silicon wherein its transmission characteristic absorbs optical energy from UV about 250 nm up to near infrared about 1150 nm whereby solar energy warms the window with absorption of this solar flux, reducing a number of solar rejection coating layers by eliminating a need for shortwave blocking of 250-1150 nm. In ensuing embodiments the silicon window has a solar rejection coating on an exterior surface having a substantially narrow bandpass region for laser communications.

Another embodiment provides a method for fabricating an athermal two-mirror Cassegrain lasercom telescope device comprising bonding a primary mirror into a telescope metering tube; preparing a secondary mirror and a window; and bonding an internal Acquisition FOV field stop snout to a rear of the primary mirror. For yet further embodiments, an optical star tracker operates over a spectral region of 1000-1600 nm, and the lasercom operates over a spectral region of 1540-1570 nm. Other embodiments further comprise manufacturing the primary mirror comprising procuring a monocrystalline silicon blank about 5.6" diameter by about 1.1" thick; diamond grinding a spherical surface, a rear pocket/web structure, and edge O-ring grooves; diamond fine-grinding a parabolic curvature on a front surface; diamond machining the front parabola and a flat rear surface; magnetorheological finishing final polishing of the primary mirror; diamond machining a center hole for a field-stop snout; diamond turning an outer diameter and an annulus concentric with the center hole; and applying a protecting gold coating to the front parabolic surface. In continued embodiments the step of preparing a secondary mirror and a window comprises bonding the secondary mirror and the window and aligning the window and a bezel. For additional embodiments, the step of preparing a secondary mirror and a window comprises diamond machining a hyperbolic curvature of the secondary mirror, integral to the window, as part of a same process as a machining of a meniscus window curvature.

A yet further embodiment provides an athermal two-mirror Cassegrain optical star tracker and lasercom telescope system comprising providing a telescope metering tube; a primary mirror; a window; a secondary mirror; a snout; and a lens cell; bonding the primary mirror into the telescope metering tube; preparing the secondary mirror and the window comprising fine sand blasting the Secondary Mirror bond surface and a window surface in an area where the secondary mirror will be bonded; bonding the secondary mirror and the window comprising using a fixture centering the secondary mirror, measuring a runout of a diameter of the secondary mirror to a diameter of the window using an air bearing and dial indicator, wherein a Total Indicated Runout (TIR) is about 0.0045"; and aligning the window and a bezel comprising assembling the secondary mirror-window assembly into the window bezel; wherein a surface to which the window mates has a 0.5° angle to tilt the window to prevent Transmitter (TX) laser back reflection from entering a Receiver (RX) channel; wherein the secondary mirror also has about a 0.5° cut to its mating surface to the window; and clocking the window such that the secondary mirror mirrored surface returns light directly back into the telescope.

Figure 1:
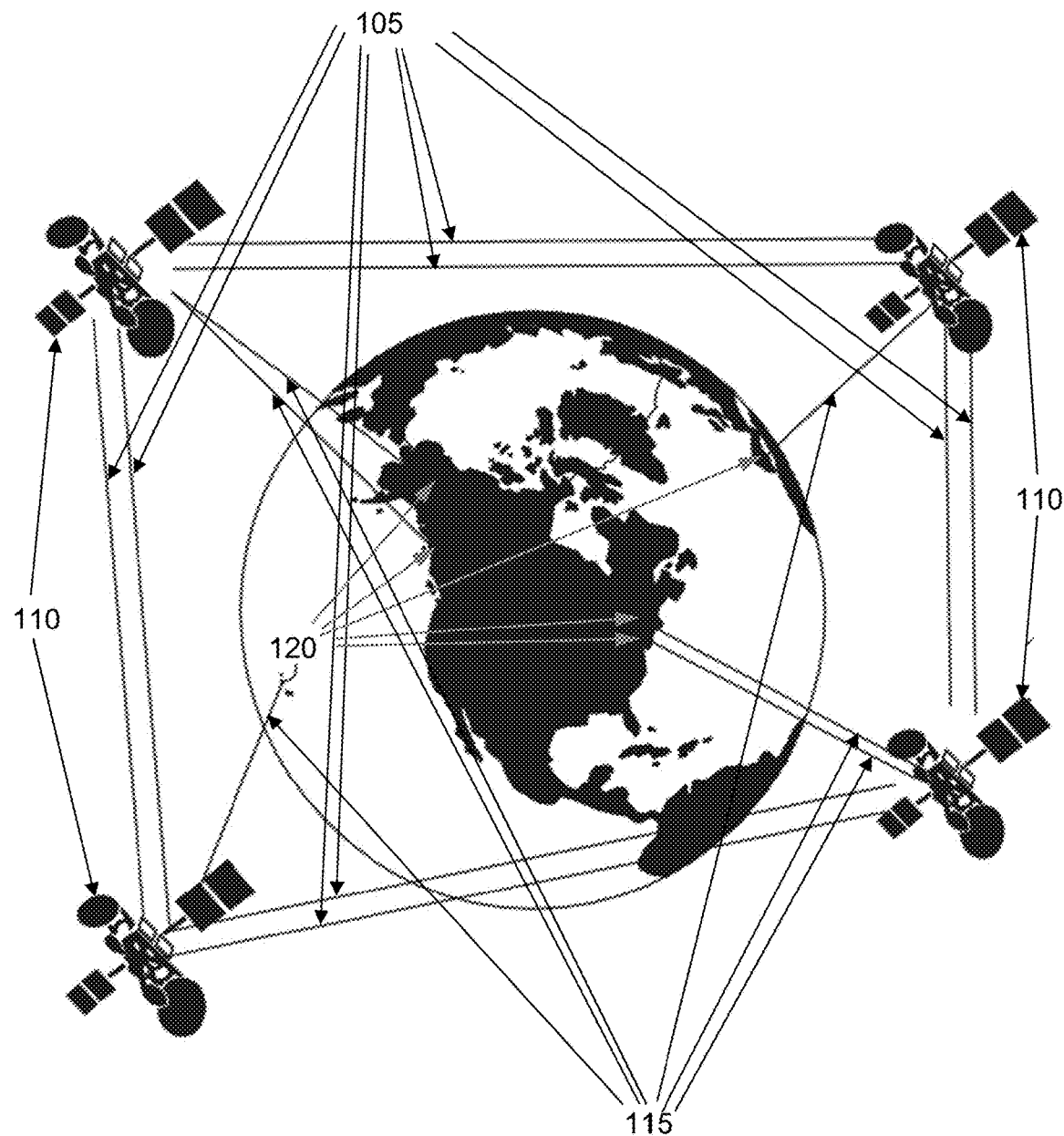
FIG. 1 illustrates lasercom communication between orbiting satellites, and between the satellites and ground-based nodes.
Figure 2:
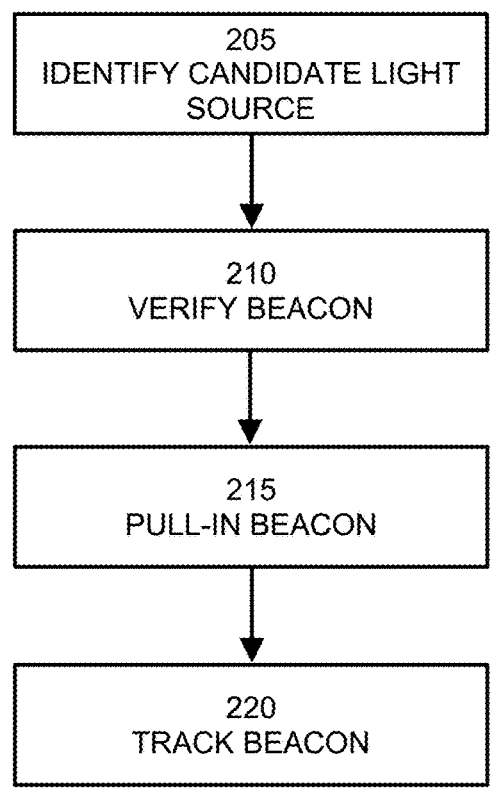
FIG. 2 is a generalized flow chart illustrating steps for aligning a lasercom receiving system with a transmitting node.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Each of U.S. patent application Ser. No. 15/457,081 filed Mar. 13, 2017 titled Celestial Navigation Using Laser Communication System; application Ser. No. 15/968,083 filed May 1, 2018 titled Apparatus and Method for Rapid Identification of Laser Communication Beacons; application Ser. No. 16/000,991 filed Jun. 6, 2018 titled Apparatus and Method for Rapid Identification of Laser Communication Beacons; application Ser. No. 16/001,225 filed Jun. 6, 2018 titled Flexible Design for a Tunable Optical Filter (TOF) Processing Block; application Ser. No. 16/002,052 filed Jun. 7, 2018 titled Apparatus and Method for Rapid Identification of Candidate Laser Communication Beacons; application Ser. No. 16/003,690 filed Jun. 8, 2018 titled Pointing Control with Fiber Nutation; and application Ser. No. 16/122,999 filed Sep. 6, 2018 titled Acquisition and Pointing Device, System, and Method Using Quad Cell is herein incorporated by reference in its entirety for all purposes.

Embodiments comprise a two-mirror Cassegrain telescope architecture (instead of more complex 3-mirror or 4-mirror designs), with simplified construction for manufacturability and cost-effectiveness. The first embodiment summarized herein is an afocal design with angular demagnification of the telescope entrance pupil (e.g., 5× to 50× magnification; 10× in this example), but an alternate embodiment comprises a focal design with a telescope back focal length. Distinctive features of this simplified architecture comprise the following.

No 'spider' vanes are used as support structure for a secondary mirror cell. Instead, the telescope window serves as the support structure for the secondary mirror. The advantage is a reduction in parts, and a simpler telescope integration and alignment process, resulting in enhanced manufacturing producibility, and cost effectiveness.

There is no tip/tilt/focus adjustment of a secondary mirror cell. The advantage is a reduction in parts, and a simpler telescope integration and alignment process, resulting in enhanced manufacturing producibility and cost effectiveness.

An internal Acquisition FOV field stop, incorporated into a conical structure ('snout') extends from the rear surface of the primary mirror or the primary mirror support structure. This greatly aids in the rejection of undesired inbound off-axis light rays, particularly off-axis solar rays and scattered solar energy from any particulate contamination on the window. In addition, the snout field stop and structure also baffles (rejects) inbound off-axis light from other undesired laser systems and laser threats, and also rejects back-scattered flux from the outbound lasercom transmit laser, which can arise from window coating reflections and particulates.

The athermal telescope design uses a thermally-matched silicon carbide structure with silicon optics (i.e., silicon primary and secondary mirrors, and preferably a silicon window as well). Distinguishing features of this telescope architecture and material selection follow.

Athermal telescope performance is immune to extreme temperature soaks hot or cold, it uses structural materials and optical materials that have the same Coefficient of Thermal Expansion (CTE, in parts per million per degree Centigrade/Kelvin). A CTE-matched structure and mirrors result in an athermal design: a distinction here is an athermal telescope using Silicon Carbide (SiC) structure with Silicon (Si) optics. The CTE of these materials are 2.6 ppm/deg C. for Si, and 2.2-2.6 ppm/deg C. for SiC, depending on the formulation and processing. The CTE-match can be perfect, or nearly perfect (e.g., a SiC—Si difference in CTE of 0 to 0.2 ppm/deg C.).

SiC was selected for embodiments for its high figure of merit for: its thermal stability (low CTE); its high thermal conductivity to greatly minimize solar thermal gradients; and its exceptional structural strength to withstand rocket launch loads with minimal mass. A distinction here is the pairing of SiC with Si optics, and the implementation described below.

In addition to CTE considerations, primary and secondary mirror embodiments are made of Silicon to facilitate precision diamond machining of their curvature and surface finish. The primary mirror is lightweighted with rear pockets in an embodiment implementation, which has demonstrated excellent results with no print-thru wavefront error.

A Silicon solar-rejection window also serves as a transparent support structure for the integrated secondary mirror. Distinguishing features of this telescope architecture and material selection comprise the following.

Silicon is transparent in the near-infrared at wavelengths such as the 1530-1570 nm ('1550') region often considered for lasercom applications. In a first embodiment, the lasercom window is optical-grade monocrystalline silicon, which provides the desired CTE-matched properties of Si optics with the SiC telescope structure. In alternate embodiments the window is another optical material, such as fused silica (CTE=0.55 ppm/deg C.) or N-BK7 (CTE=7 ppm/deg C.), using appropriate thermal flexures or bonding and mounting techniques.

A Silicon window is also used in a first embodiment because of its transmission characteristic that absorbs optical energy from the UV (250 nm) up to the near infrared (about 1150 nm). Solar energy can be used to help warm the window with the absorption of this solar flux, and to reduce the number of solar rejection coating layers by eliminating the need for shortwave blocking of 250-1150 nm.

In a first embodiment, the silicon window has a solar rejection coating on the exterior surface. This coating has a relatively narrow bandpass region for laser communications with a full width half maximum (FWHM) passband such as 1520-1580 nm or 1475-1625 nm, supplemented by narrower optical filters on the optical bench for greater wavelength selectivity. An anti-reflection coating (typically R<0.25%) is used on the interior window surface to optimize the window transmission within the passband.

This telescope optical design, and similar embodiments, can be used to realize a star tracker navigation function in addition to laser communications. In this case, the solar rejection coating on the window passes a wider spectral region, such as 1300-1600 nm, to allow more of the star energy to be used for sensing. The representative telescope design described herein is such that it supports the use of the star tracker function, regardless of whether the window solar rejection filter passes the wider passband needed for star-fix functionality.

If the silicon short-wavelength absorption characteristic is not desired for a particular lasercom application, a more traditional window solar rejection coating embodiment can be implemented with blocking layers that reflect some or all of the 250-1150 nm region.

In the first embodiment, the Silicon window has a meniscus shape: a curved optic with constant thickness, which has very low optical power. This geometry has a convex curved surface on the inside, and a concave surface on the exterior. The curvature causes transmit laser backreflections to be widely dispersed, which greatly facilitates the required transmit-receive isolation. In an alternate embodiment a flat window is used, with the window tilted slightly to avoid backreflections of the lasercom transmit laser into the receive optics. However, another benefit of a meniscus window is that it is perpendicular to the telescope line of sight, and avoids the assembly and alignment complexity required to tilt a flat window.

Advantage from the use of a Silicon window is that it is very well suited to precision diamond machining in a short period of time. This is a manufacturing advantage over traditional grind and polish techniques. In the first embodiment implementation, the secondary mirror is integral to the window, and its hyperbolic curvature is diamond-machined as part of the same process as the machining of the meniscus window curvature. This provides the inherent accuracy of the diamond machining process to ensure exacting mirror centration and curvature without tilt: a manufacturing and integration benefit. In an alternate approach, a separate secondary mirror could be centered and bonded to the interior surface of the window.

The telescope along with the optical bench are designed to realize the unique concept of using the optical system as a precision star tracker in addition to the lasercom function. This requires telescope and bench optical designs that perform well over the very broad 600 nm spectral region (1000-1600 nm) for the adjunct star tracker, as well as the narrow 30 nm region (1540-1570 nm) for the lasercom operation.

Embodiments disclose a silicon carbide (SiC) telescope having a 30% larger aperture diameter (5.25") than typical designs (4"), providing an additional 2.3 dB of link margin while maintaining low SWAP and low risk. These are especially beneficial for GEO-Earth applications. Similar designs ranging from 4" to 8" are representative.

The telescope structure in this example is silicon carbide, with silicon optics (primary, secondary, and window). Embodiments of the Cassegrain telescope include an internal field stop to increase off-axis stray light rejection. The selection of SiC is used for structural properties, strength, and thermal conductivity to minimize gradients. In embodiments, Silicon optic s are Coefficient of Thermal Expansion (CTE)-matched to the SiC structure, and are diamond machined. Zero to 10 ppm/° C. is considered a low CTE. The Secondary Mirror is diamond machined, and integral to the Si window. The Si window absorbs UV and visible light for near-infrared (1.55 um) applications.

Figure 3:
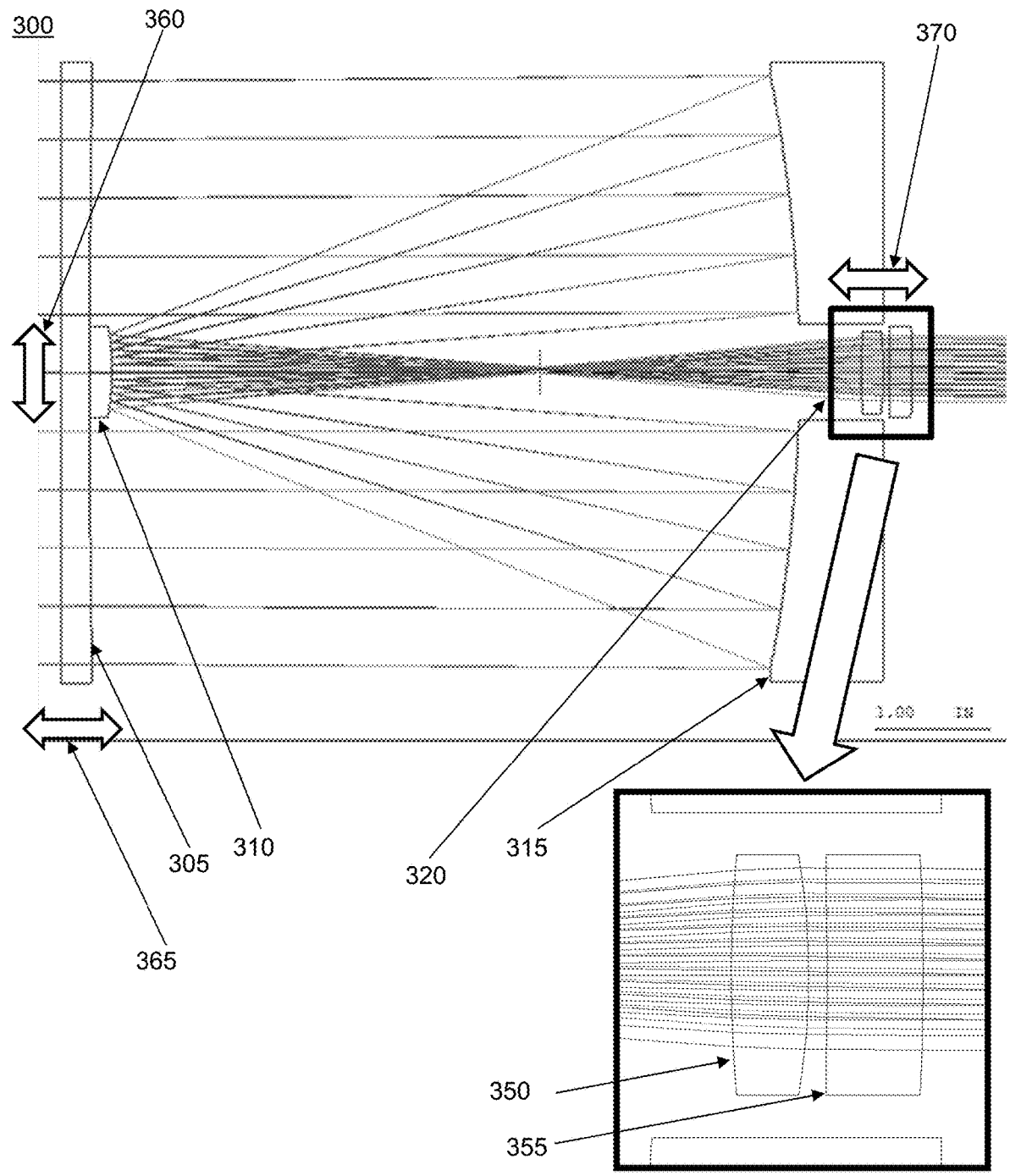
FIG. 3 depicts telescope components ray tracing configured in accordance with an embodiment.

FIG. 3 depicts telescope components ray tracing 300 according to one example. Telescope components comprise: window 305; secondary mirror 310 mounted on or integral to the window 305; primary mirror 315; and lens group 320. Lens group 320 comprises first lens 350 and second lens 355. Further depicted are window/SM decenter 360; window/SM despace 365; and rear cell despace 370. Embodiments comprise 5.45" or 6.07" PM-SM distances; a lens footprint of 0.547" or 0.65"; a first lens 350 of fused silica, and a second lens 355 of K5G20. In embodiments, compensators are used for window/SM tilt despace and decenter and rear cell despace.

Optics in this embodiment are radiation hardened glass. The index of refraction/dispersion parameters of silica and K5G20 glasses are used for the air-spaced design. This prioritizes athermalization over achromatization. The radiation-hardened thermo-optic coefficient (dn/dT) of a silicon SM athermalizes the assembly well.

Figure 4:
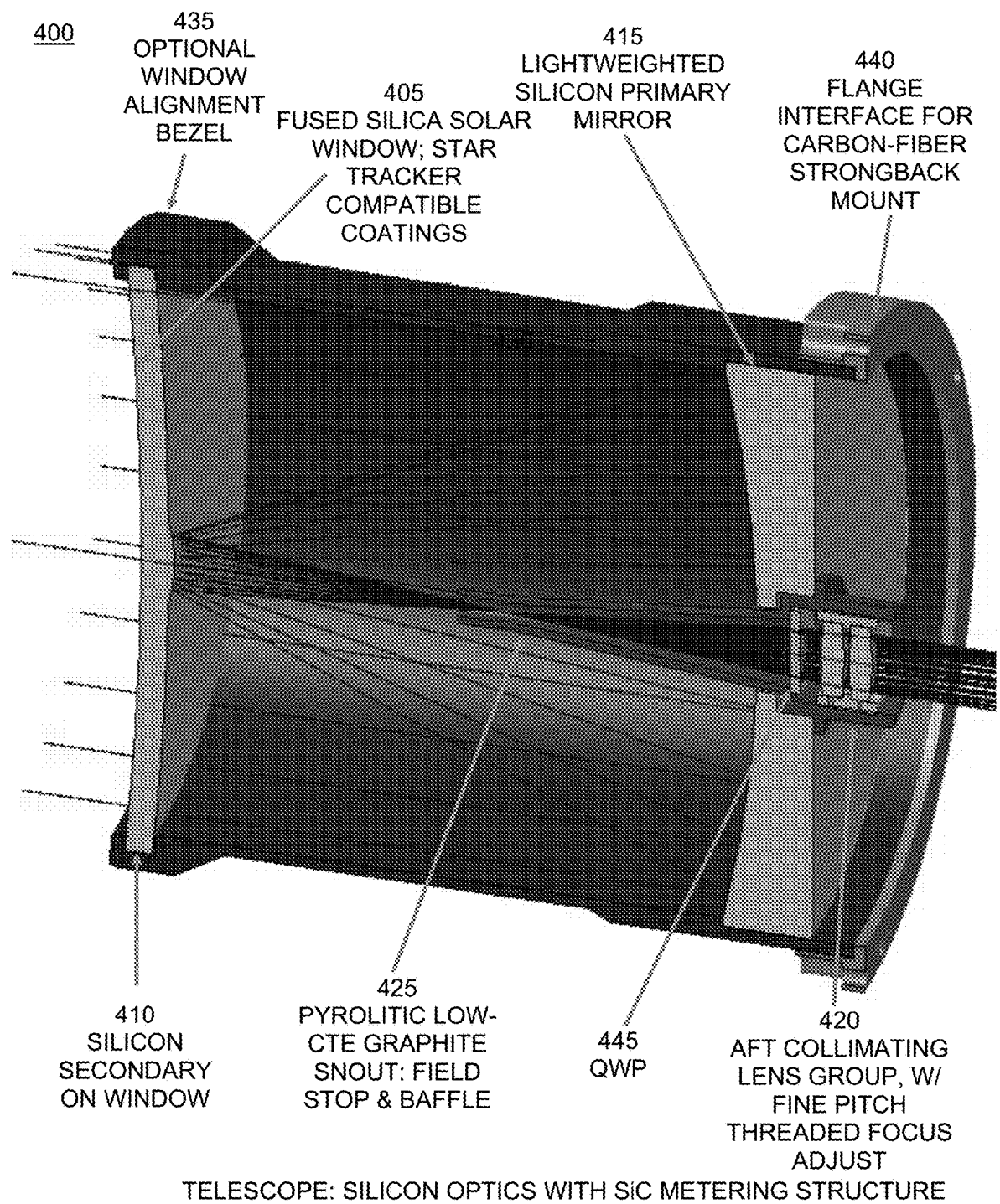
FIG. 4 is a telescope perspective view configured in accordance with an embodiment.

FIG. 4 is a telescope perspective view 400. Telescope components comprise: fused silica solar window with star tracker compatible coatings 405; secondary mirror mounted on window 410; primary mirror 415; aft collimating lens group 420; pyrolytic low-CTE graphite snout, field stop, and baffle 425; telescope metering tube 430; window alignment bezel 435; flange interface for carbon-fiber strongback mount 440; and QWP 445.

Low-SWAP embodiment telescope hardware for a 5.25" aperture weighs between 3 and 4 lbs., or about 3.6 lbs., 45% lighter than the 6.6 pound (3.0 kg) European space Agency (ESA) 5.25" lasercom telescope. For this, embodiments use a low CTE silicon carbide (SiC) telescope metering tube structure in the form of a solid tube of varying wall thickness to accurately maintain the spacing between the primary and secondary mirrors. This SiC metering structure has optimal thermal conductivity compared to other alternatives, which minimizes thermal gradients to maintain diffraction-limited wavefront error in the presence of asymmetrical solar illumination on-orbit.

Figure 5:
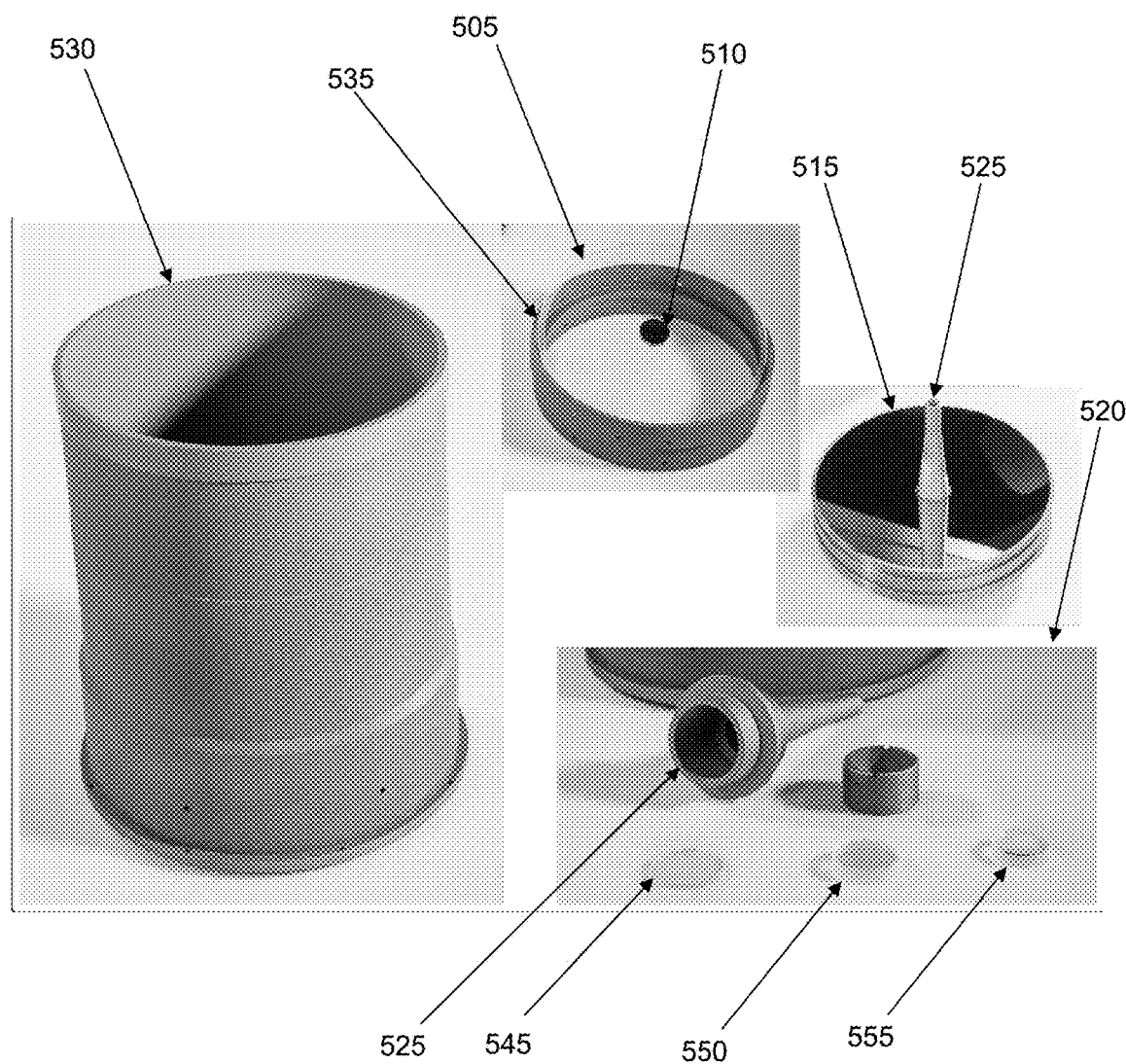
FIG. 5 depicts telescope components configured in accordance with an embodiment.

FIG. 5 depicts telescope components 500. Telescope components comprise: solar window 505; secondary mirror 510 mounted on window 505; primary mirror 515; aft collimating lens group 520; snout, field stop, and baffle 525; telescope metering tube 530; and, optional depending on embodiment, window alignment bezel 535. Lens cell group 520 comprises QWP 545, first lens 550, and second lens 555.

Regarding the telescope parts in FIG. 5: the silicon carbide telescope tube has stepped wall thickness, length about 7.5". The solid telescope tube structure avoids the complexity of a 3 or 4 legged 'spider' to support the secondary, with an added separate outer light baffle tube.

Silicon primary mirror: snug fit into rear of telescope tube, registers against a lip inside. Grooves for two O-rings around the rim nominally center it, for bonding with six epoxy pads between the O-rings. Bond line is thin, about seven mils, and Si mirror and SiC telescope tube have a perfect CTE match, so a very rigid epoxy with exceptionally low CTE is used to maintain optical alignment over temperature extremes.

Window and bezel: in one example the window is only about 0.25" thick, in the range of 0.2" to 0.3" thick with a solar rejection coating on the outer surface. The secondary mirror is centered with a tool and bonded directly to the window. This avoids the added parts and complexity of a separate cell to hold the mirror, with precision x,y,z alignment features. Instead, a jig that embodies this complexity centers the window+secondary mirror in the aperture, then it is bonded-in-place.

Snout: the long snout body performs a spatial light baffle function, and a small hole near the end is the field stop. This combination is used to prevent scattered light and off-axis solar flux from getting into the optical bench. (Optical filtering on the window and in the optical bench performs the spectral discrimination.) The snout in one example is fabricated from a low-CTE pyrolytic graphite, for light weight and to match the silicon primary CTE. The snout flange is rigidly bonded to the rear surface of the primary to keep the lens cell precisely centered during thermal cycling.

Shown is a small lens cell group 520 comprising a quarter-wave plate (QWP) and a collimating lens pair. The lenses are bonded into the lens cell. The lens cell is fabricated from the same specialty graphite material as the snout. The OD of the lens cell has fine-pitch threads that allow it to be precisely adjusted longitudinally for focus during the telescope alignment process. When complete, the rear of the lens cell is bonded to the snout so it cannot move during launch loads.

Figure 6:
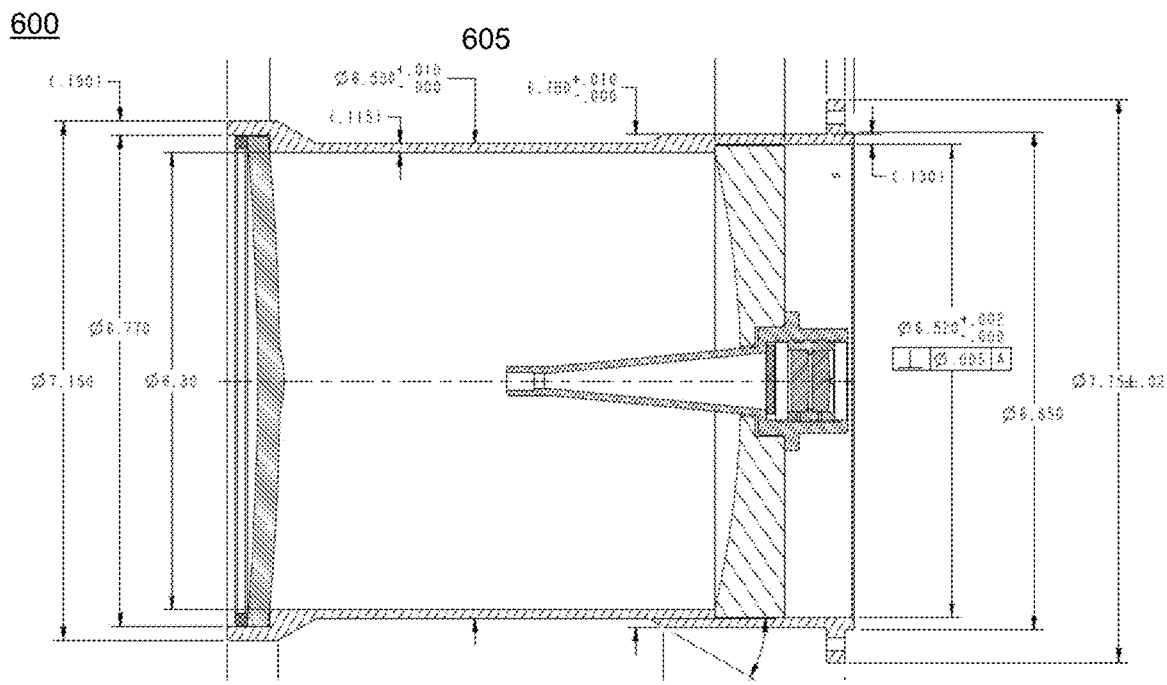
FIG. 6 depicts telescope details configured in accordance with an embodiment.
Figure 6:
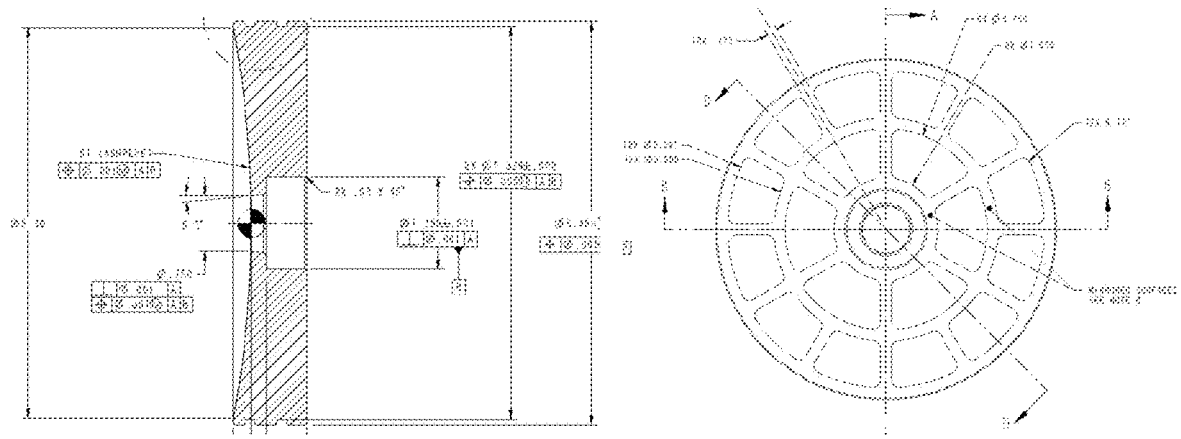

FIG. 6 depicts telescope details 600. Views to scale are telescope cross-section 605; primary mirror cross section 610; and primary mirror plan view 615.

Figure 7:
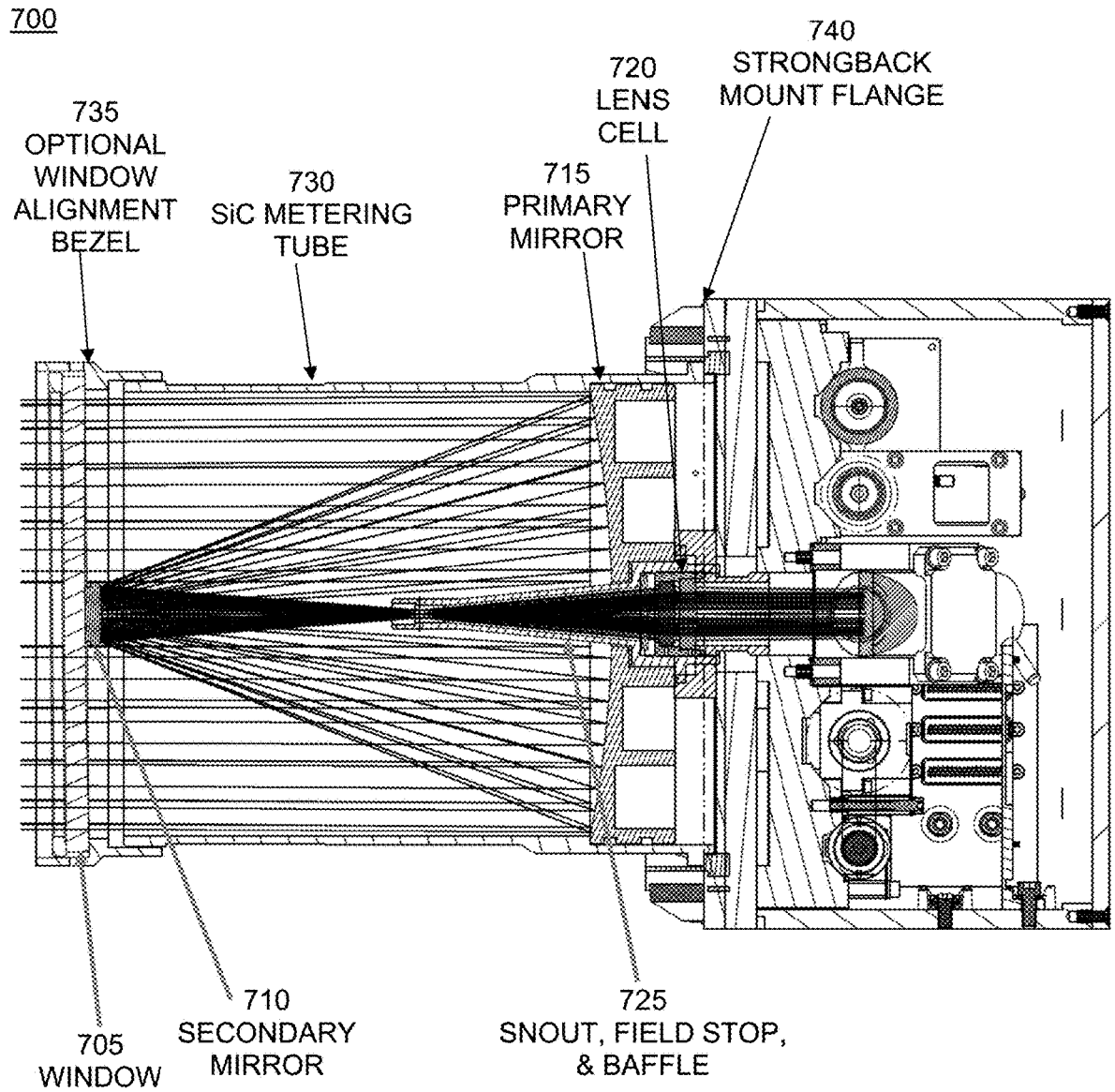
FIG. 7 depicts Cassegrain telescope optical ray path configured in accordance with an embodiment.

FIG. 7 depicts Cassegrain telescope optical ray path 700. Components comprise: window 705; secondary mirror mounted on window 710; primary mirror 715; aft collimating lens cell group 720; snout, field stop, and baffle 725; telescope metering tube 730; optional depending on embodiment, window alignment bezel 735; and flange interface for carbon-fiber strongback mount 740.

The SiC metering structure has a low CTE of 2.5 ppm/deg C. and a high stiffness which aids both thermal and structural stability. Significantly, in embodiments, the primary and secondary mirrors are both made of silicon (Si), which has the same CTE as the SiC metering structure. This CTE-matched combination results in telescope performance that is athermalized from −40 C to +80 C.

Figure 8:
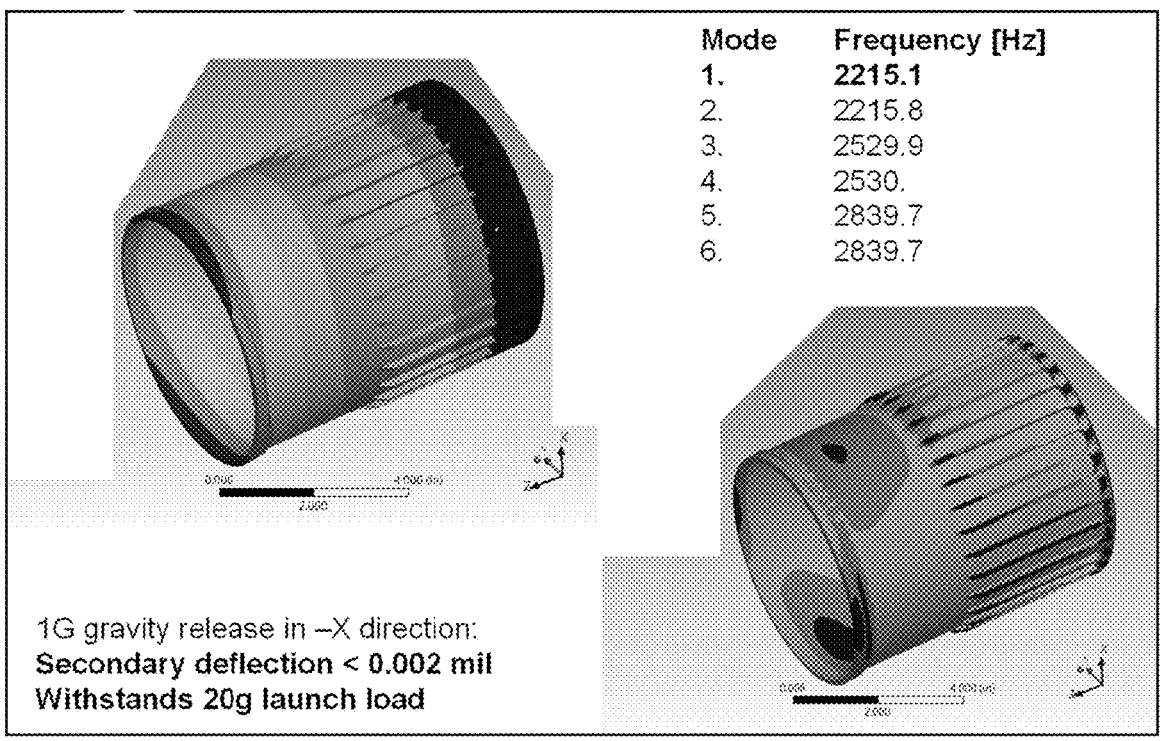
FIG. 8 depicts telescope metering tube stress performance configured in accordance with an embodiment.

FIG. 8 depicts telescope metering tube total deformation and equivalent (von-Mises) stress performance 800. Structural Finite Element Analysis (FEA) modeling shows the 1 g gravity release impact to WaveFront Error (WFE) and pointing is ten times better than required. The 2200 Hz resonance corresponds to ample stiffness for greater than 20 g launch loads. The low-SWAP telescope provides high stiffness to survive launch acceleration, vibration, and acoustic loads, but especially to maintain on-orbit diffraction-limited WFE and microradian boresight alignment arising from 1 g-release.

Figure 9:
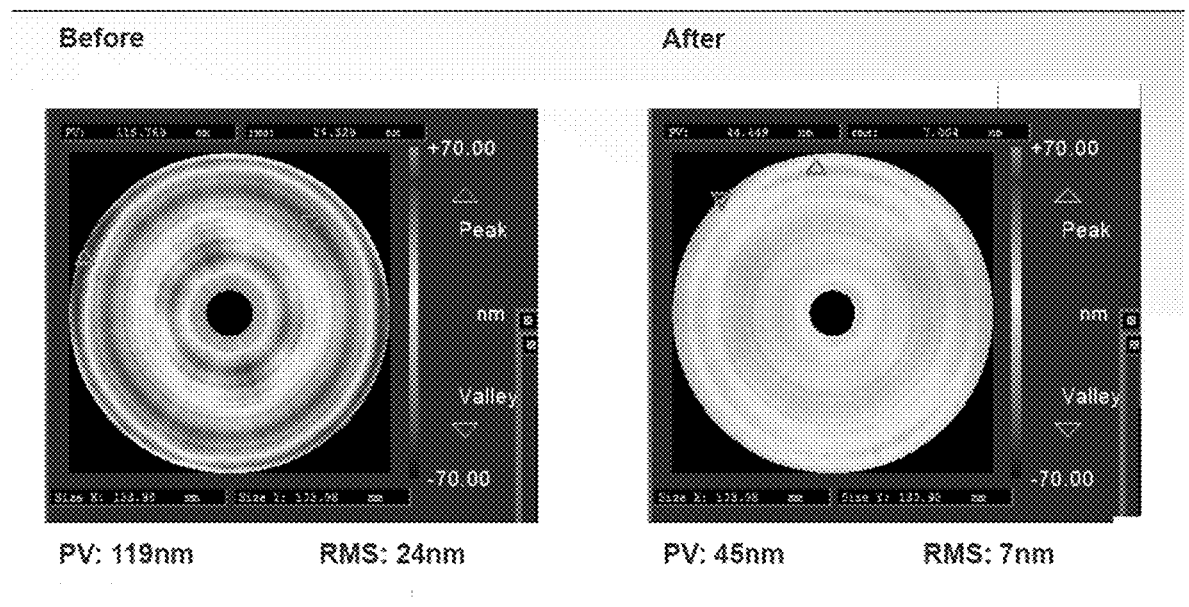
FIG. 9 depicts mirror performance configured in accordance with an embodiment.

FIG. 9 depicts primary mirror performance 900 according to one embodiment. On the left is the primary mirror after Single Point Diamond Turning (SPDT), on the right is the surface figure after final Magnetorheological Finishing (MRF) polishing. As seen in FIG. 9, after SPDT, the primary mirror surface figure parabola was about 0.015 waves RMS at 1550 nm, and the surface roughness was only 24 Å RMS, with 'mid-spatial-frequency (MSF) structure' that can affect Modulation Transfer Function (MTF). There is no print-through of the lightweighted rear webs and pockets. On the right, after the final MRF polish, the final wavefront was reduced to about 0.0045 waves RMS at 1550 nm and the surface roughness was only 9 Å RMS.

The primary mirror is one of the challenging elements of the telescope. In this example it is a silicon optic with 5.25" clear aperture and 5.50" O.D. The lasercom telescope primary mirror has an effective F-number of f/1.2 for manufacturability, alignment tolerances, and net cost effectiveness. For comparison, the reference design is f/0.7. The difficulty of manufacture (component cost) is inversely related to the f/#, and various alignment sensitivities (I&T cost) are inversely related to the square and the cube of the f/#. As a result, the f/1.2 telescope is physically longer than a f/0.7 version, but it is much more producible and cost effective. In spite of the length, careful attention to SWAP has resulted in a design that is 45% lighter than the ESA lasercom telescope with the same 5.25" aperture.

The silicon primary mirror in this example is diamond machined. Embodiments use different solar rejection schemes that address the wavefront error risk of the thick 100-layer solar rejection coating. Embodiments use different adhesives. Both are space-grade adhesives that meet NASA outgassing specs, and are specially formulated to maintain their bond strength and structural integrity down to cryogenic temperatures of −115 C for one adhesive and −260 C for the other. A first adhesive provides stable optical alignment over temperature, is a very rigid adhesive with an exceptionally low CTE. It is used to bond the adherends which have low CTE (0.5 to 2.5 ppm/deg C.). The second adhesive has a much lower modulus adhesive that is lower risk for thermal cycling, but has a higher risk for maintaining pointing and wavefront error over operational temperature extremes of −40 C to 75 C.

Figure 10:
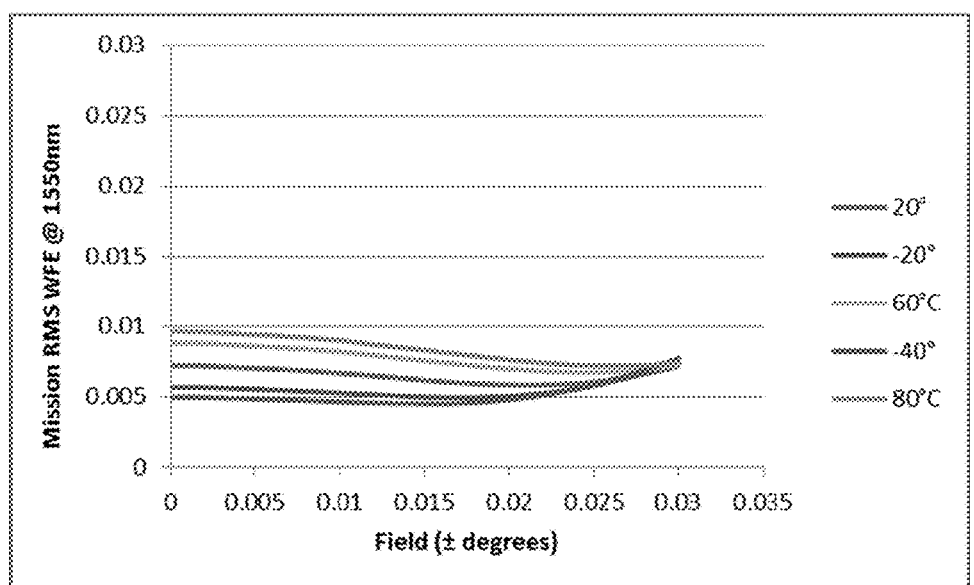
FIG. 10 depicts athermalized performance configured in accordance with an embodiment.
Figure 10:
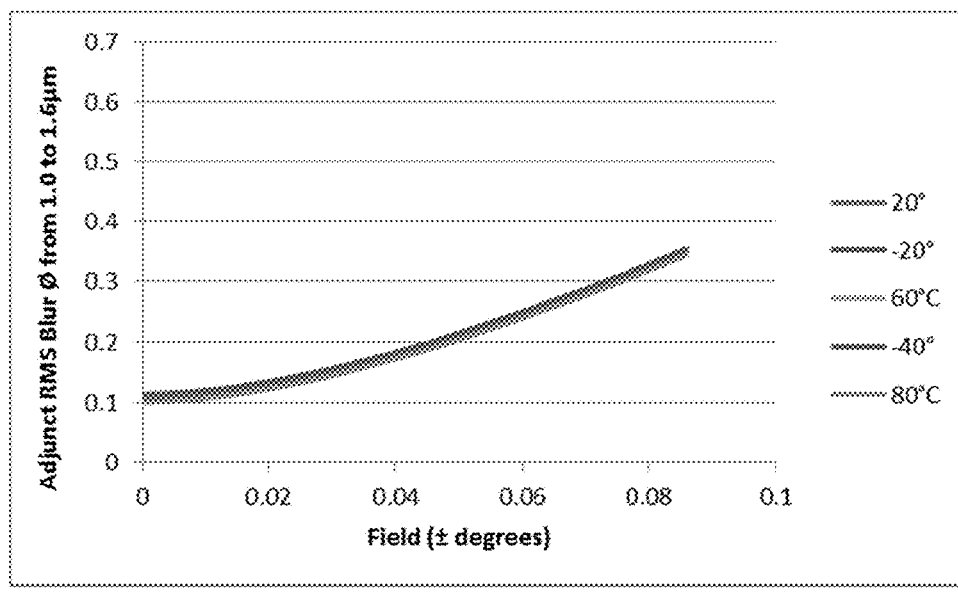

FIG. 10 depicts athermalized performance 1000. Depicted are target RMS WFE at 1550 nm and adjunct RMS blur diameter from 1.0 to 1.6 μm at −40 to +80 degrees C. Results are well-athermalized, shown using a CTE of 2.4 ppm/K across the entire range for the telescope tube, the PM, and the SM. This CTE represents SiC as well as Silicon. Embodiments compensate for SiC and Silicon with different CTEs by adjusting the optical prescription. This athermal telescope design with Si optics and SiC metering structure maintains better than 0.01 RMS waves diffraction-limited WFE across an extreme temperature range of −40° C. to +80° C. The WFE budget for the system is 0.02 waves RMS from −40° C. to +60° C.

Figure 11:
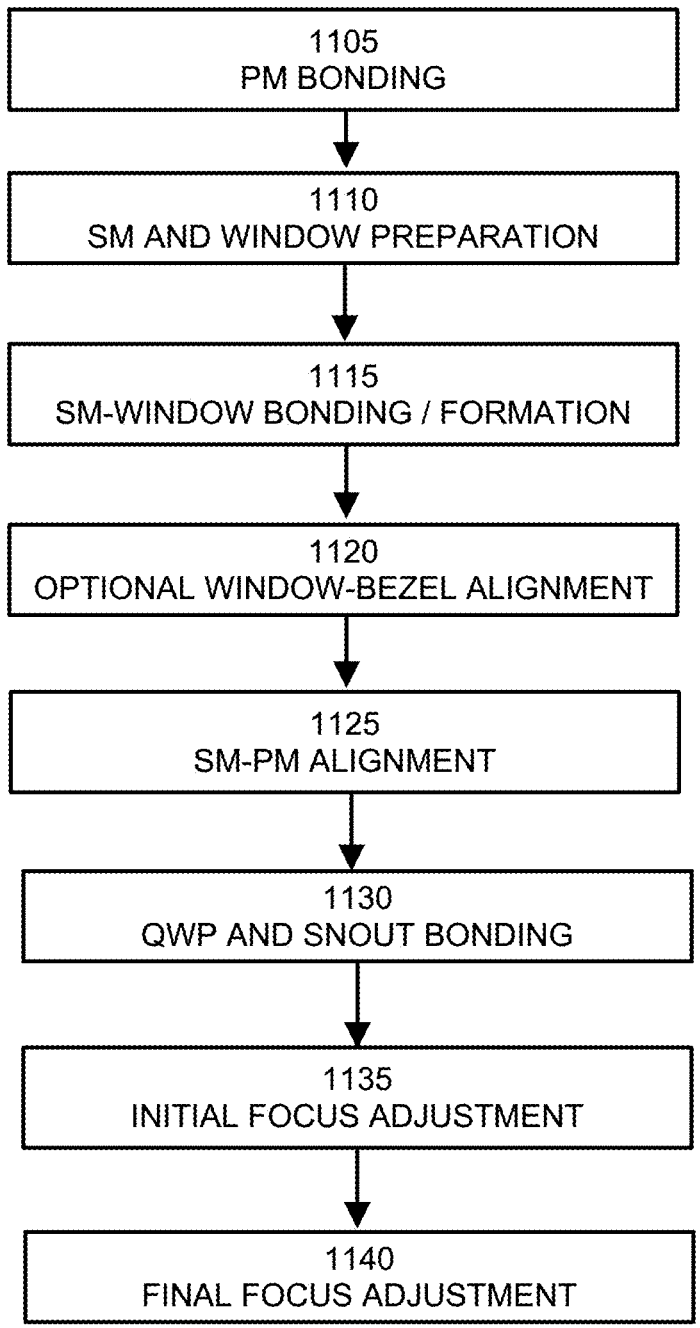
FIG. 11 is a flow chart for a telescope assembly and alignment method configured in accordance with an embodiment.

FIG. 11 depicts a telescope assembly and alignment method 1100 comprising the steps of: PM bonding 1105. Bond the Primary Mirror (PM) into the SiC Telescope Tube. SM and Window preparation 1110. Fine sand blast the Secondary Mirror (SM) bond surface and the window surface in the area where the SM will be bonded. SM-Window Bonding 1115. Bond the SM to the window using a fixture designed to keep the SM centered to about 0.0045". The Total Indicated Runout (TIR) of the SM diameter to the window diameter is measured using an air bearing and dial indicator. Window-Bezel Alignment 1120. Assemble the SM-Window assembly into the window bezel. The surface that the window mates to in the bezel has a 0.5° angle to tilt the window to prevent TX laser back reflection from entering the RX channel. The SM also has a 0.5° cut to its mating surface to the window. Embodiments adjust the 0.5° to higher or lower values to control stray light for other operating environments. The window therefore needs to be clocked such that the SM mirrored surface focuses light directly back into the telescope (i.e. zero out the tilts). This is done by using a laser autocollimator with the window and SM on an air-bearing and adjusting the bevel clocking until the returned light does not move when the air-bearing is rotated. SM-PM Alignment 1125. Assemble and align the SM-Window assembly to the PM bonded in the telescope tube using an infrared interferometer. Bond the bezel to the telescope tube and the window to the bezel once the alignment is completed for optimum optical performance. This alignment is accomplished using a fixture designed to support the SM-Window Assembly on the end of the telescope tube. A retro-reflector inside the snout provides the return to the interferometer. The fixture allows the SM-Window Assembly to be adjusted in tip-tilt, clocking, centration, and spacing relative to the PM. This is the most difficult part of the telescope build due to the simultaneous adjustments to the window. Embodiments employ a snap-fit design to simplify the alignment. QWP and Snout bonding 1130. A Quarter Waveplate (QWP) is bonded inside the snout using shims to add tilt to prevent back reflection. The snout is then bonded to the rear of the PM. Lenses are then bonded into the lens cell and it is threaded into the snout. Initial Focus adjustment 1135. The telescope is flipped over so that the window side faces downward and a flat return is placed below it. This allows the infrared interferometer to be used to adjust the focus of the lens cell (adjusted from the rear of the PM, the lens cell threads into the snout). The lenses are adjusted to get the best wavefront (fringes) from the light returned to the infrared interferometer. Final Focus adjustment (1550 nm) 1140. This step is only necessary if the interferometer used for the initial focus adjustment used a different wavelength than the lasercom wavelength of 1550 nm, AND a 1550 nm interferometer is not available for this step. Several setups are used for the focus adjustment. First, a 1550 nm laser is aligned with an off-axis parabola (OAP) to produce a collimated beam of at least 5.25" diameter into the window end of the telescope. A shear plate is used to adjust the lens cell until predetermined good fringes are seen exiting the lens end of the telescope. Next, a 1550 nm Wavefront Sensor is used to directly measure wavefront of the light exiting the lens end of the telescope. The lens cell is adjusted to optimum wavefront readings on the sensor. Another optical setup is used to validate the focus. A 1550 nm collimated beam is directed into the lens end of the telescope using a beam splitter. A return flat is positioned above the telescope window and the light is returned into the 1550 nm Wavefront Sensor. The focus is verified using this setup. Once focused, the lens is purposefully de-focused by rotating the lens cell 41° inward (toward the SM). This de-focus is necessary to compensate for the vacuum environment which causes de-focus; other embodiments rotate the lens cell different amounts to account for other operating conditions.

In embodiments, the secondary mirror is integral to the window, and its hyperbolic curvature is diamond-machined as part of the same process as the machining of the meniscus window curvature.

The primary mirror manufacturing steps are as follows. (1) Procure monocrystalline silicon blank, 5.6" dia.×1.1" thick. (2) Diamond grind (rough/fine) spherical surface, rear pocket/web structure, edge O-ring grooves. (3) Diamond fine-grind parabolic curvature on front surface. (4) Diamond machine front parabola and flat rear surface. (5) Final MRF polish of the mirror. (6) Diamond machine center hole for field-stop snout. (7) Diamond turn OD and annulus concentric with center hole. (8) Apply protected gold coating to front parabolic surface.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. An athermal two-mirror Cassegrain telescope device comprising:
    a telescope metering tube, wherein said telescope metering tube comprises silicon carbide (SiC);
    a silicon primary mirror affixed to said telescope metering tube, having a low Coefficient of Thermal Expansion (CTE) difference between said telescope metering tube and said silicon primary mirror;
    a silicon window;
    a silicon secondary mirror, integral to or supported by said silicon window;
    an internal Acquisition Field OF View (FOV) field stop snout bonded to a rear of said silicon primary mirror and extending forward into said telescope metering tube; and
    a lens cell affixed to said snout and holding at least two lenses that collimate light exiting an end of said telescope metering tube.

2. The device of claim 1 further comprising a star tracker navigation function and a laser communication function, wherein a solar rejection coating on the exterior surface of said silicon window passes a spectral region comprising 1000-1600 nm, to allow star energy to be used for sensing.

3. The device of claim 1 wherein the low CTE difference is 0 to 0.2 ppm/deg C.

4. The device of claim 1 wherein said silicon primary mirror and said telescope metering tube have a substantially exact Coefficient of Thermal Expansion (CTE) match, whereby a rigid epoxy with a low CTE is used to maintain optical alignment over temperatures between −40 and +80 degrees C.

5. The device of claim 1 wherein said silicon window is about 0.25" thick, further comprising a solar rejection coating on an outer surface.

6. The device of claim 1 wherein a long body of said snout performs a spatial light baffle function, and a hole near an end is a field stop;
    whereby scattered light and off-axis solar flux is reduced.

7. The device of claim 1 wherein said snout is fabricated from a low Coefficient of Thermal Expansion (CTE) pyrolytic graphite for light weight and to substantially match a CTE of said silicon primary mirror.

8. The device of claim 1 wherein a flange of said snout is rigidly bonded to a rear surface of said silicon primary mirror whereby said lens cell is precisely centered during thermal cycling.

9. The device of claim 1 wherein the silicon primary and silicon secondary mirrors have a Coefficient of Thermal Expansion (CTE) of about 2.6 ppm/deg C. and the telescope metering tube has CTE in a range of 2.2-2.6 ppm/deg C.

10. The device of claim 1 wherein said silicon window transmission characteristic absorbs optical energy from an ultraviolet (UV) wavelength of about 250 nm up to near infrared about 1150 nm whereby solar energy warms said silicon window with absorption of a solar flux, reducing a number of solar rejection coating layers by eliminating a need for shortwave blocking of 250-1150 nm.

11. The device of claim 10 wherein said silicon window has a solar rejection coating on an exterior surface having a substantially narrow bandpass region for laser communications.

12. The device of claim 1 wherein said telescope metering tube, said silicon primary mirror, and said silicon secondary mirror are matched for a low Coefficient of Thermal Expansion (CTE), and wherein the low CTE is less than 10 ppm/deg C.

13. The device of claim 1 wherein said telescope metering tube, said silicon primary mirror, said silicon window, and said silicon secondary mirror have a substantially exact Coefficient of Thermal Expansion (CTE) match.

14. The device of claim 1 further comprising a star tracker navigation function and a laser communication function, wherein said optical star tracker operates over a spectral region of 1000-1600 nm, and said lasercom operates over a spectral region of 1540-1570 nm.

15. The device of claim 1, wherein said silicon secondary mirror and said silicon window are diamond machined such that there is a hyperbolic curvature of said silicon secondary mirror.

16. A method for fabricating an athermal two-mirror Cassegrain lasercom telescope device comprising:
   bonding a silicon primary mirror into a telescope metering tube, wherein said telescope metering tube comprises silicon carbide (SiC) and providing a low Coefficient of Thermal Expansion (CTE) between said telescope metering tube and said silicon primary mirror;
   preparing a secondary silicon mirror and a silicon window; and
   bonding an internal Acquisition Field of View (FOV) field stop snout to a rear of said primary silicon mirror.

17. The method of claim 16 wherein an optical star tracker operates over a spectral region of 1000-1600 nm, and said lasercom operates over a spectral region of 1540-1570 nm.

18. The method of claim 16, wherein said step of preparing the secondary silicon mirror and the silicon window comprises bonding said secondary silicon mirror and said silicon window and aligning said silicon window and a bezel.

19. The method of claim 16, wherein said step of preparing the secondary silicon mirror and the silicon window comprises diamond machining a hyperbolic curvature of said secondary mirror, integral to said silicon window, as part of a same process as a machining of a meniscus window curvature.

20. An athermal two-mirror Cassegrain optical star tracker and lasercom telescope method comprising:
   providing:
      a telescope metering tube comprising silicon carbide;
      a primary mirror comprising silicon;
      a window comprising silicon;
      a secondary mirror comprising silicon;
      a snout; and
      a lens cell;
   bonding said primary mirror into said telescope metering tube, further comprising a low Coefficient of Thermal Expansion (CTE) difference between said telescope metering tube and said silicon primary mirror;
   preparing said secondary mirror and said window comprising fine sand blasting said secondary mirror bond surface and a window surface in an area where said secondary mirror will be bonded;
   bonding said secondary mirror and said window comprising using a fixture centering said secondary mirror, measuring a runout of a diameter of said secondary mirror to a diameter of said window using an air bearing and dial indicator, wherein a Total Indicated Runout (TIR) is about 0.0045"; and
   aligning said window and a bezel comprising assembling said secondary mirror-window assembly into said bezel;
   wherein a surface to which said window mates has a 0.5° angle to tilt said window to prevent Transmitter (TX) laser back reflection from entering a Receiver (RX) channel;
   wherein said secondary mirror also has about a 0.5° cut to its mating surface to said window; and
   clocking said window such that said secondary mirror mirrored surface returns light directly back into said telescope.

* * * * *